United States Patent [19]
Ventura et al.

[11] 3,844,976
[45] Oct. 29, 1974

[54] NOVEL CATALYST SYSTEM

[75] Inventors: John J. Ventura, Eastontown; Philip H. Ravenscroft, Edison, both of N.J.

[73] Assignee: M & T Chemicals Inc., New York, N.Y.

[22] Filed: Oct. 15, 1970

[21] Appl. No.: 81,139

Related U.S. Application Data

[62] Division of Ser. No. 833,805, June 16, 1969.

[52] U.S. Cl. ...... 252/431 C, 252/429 R, 252/431 R, 252/431 N, 252/441, 252/461, 260/22 CA, 260/75 R

[51] Int. Cl. ............... C08f 21/04, C08g 17/013, C08g 17/015

[58] Field of Search ............ 252/461, 431 R, 431 C, 252/429 R, 431 N, 441

[56] References Cited
UNITED STATES PATENTS

| | | | |
|---|---|---|---|
| 3,243,468 | 3/1966 | Clark et al. | 252/431 R |
| 3,346,659 | 10/1967 | Barclay et al. | 252/461 X |
| 3,412,066 | 11/1968 | Schnegg et al. | 252/431 R |
| 3,415,860 | 12/1968 | Thomas | 252/431 C |
| 3,484,410 | 12/1969 | Lazarus et al. | 252/431 C |
| 3,509,099 | 4/1970 | Carter et al. | 252/461 UX |
| 3,624,049 | 11/1971 | Ventura et al. | 252/431 R |
| 3,652,503 | 3/1972 | Hewertson | 252/429 R |

FOREIGN PATENTS OR APPLICATIONS

| | | | |
|---|---|---|---|
| 19,270 | 8/1969 | Japan | 252/431 C |

Primary Examiner—Patrick P. Garvin
Attorney, Agent, or Firm—Kenneth G. Wheeless; Robert P. Auber; Robert Spector

[57] ABSTRACT

A process for preparing polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalytic amount of a novel catalyst mixture comprising (1) an antimony compound and (2) an arsenic compound.

The antimony compounds are $Sb(Y)_n$ or $Y_3Sb=O$ and the arsenic compounds are $As(Y)_n$ or $Y_3As=O$ wherein Y is R, —OOCR, halogen, —OR, —SR, —OOCRSH, —SRCOOR' or

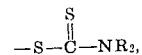

wherein R and R' are alkyl, alkenyl, cycloalkyl, aralkyl, aryl or alkaryl and n is 3 or 5.

20 Claims, No Drawings

NOVEL CATALYST SYSTEM

This application is a divisional application of Ser. No. 833,805, filed on June 16, 1969.

This invention relates to an improved method for the preparation of polyethylene terephthalate. More particularly, this invention relates to an improved polycondensation catalyst system for use in the manufacture of polyethylene terephthalate exhibiting highly desirable color characteristics, said novel catalytic composition comprising a mixture of (1) an antimony compound and (2) an arsenic compound.

It is known that polyethylene terephthalate can be prepared from a suitable methyl ester of terephthalic acid formed by initially reacting methyl alcohol with terephthalic acid. When a methyl ester of terephthalic acid is used as a starting material, it is first reacted with ethylene glycol in the presence of a transesterification catalyst by means of an ester interchange reaction. When terephthalic acid, itself, is used as a starting material, it is subjected to a direct esterification reaction with ethylene glycol in the presence of what is generally called the first stage catalytic additive or other inhibitor. In either method the resulting reaction product, an ester, is then polycondensed in the presence of a polycondensation catalyst to form polyethylene terephthalate.

Heretofore various materials have been suggested as polycondensation catalysts for polycondensing the ester products of both the transesterification method and the direct esterification method of preparing esters. However, in general, none of the substances that have been suggested as polycondensation catalysts have heretofore proved entirely satisfactory. The most deleterious result of the catalysts of the prior art has been the unsatisfactory color of the resulting polymer.

It is essential that for particular uses, that polyethylene terephthalate should exhibit a high degree of luminance together with a low degree of yellowness. Luminance (Y on the C.I.E. System) is a measure of the proportion of the incident light reflected. Yellowness is a measure, based on C.I.E. chromaticity co-ordinates of the separation of the point representing the color rating of the polymer from the point representing a standard illuminant C. Positive values are measured in the direction of a dominant wave length of 580 – 590 millimicrons and negative values are measured in the direction of a dominant wave length of 470 – 490 millimicrons. Relatively small variations in the luminance and yellowness values of polyethylene terephthalate are of great importance in deciding the value of such polyesters for commercial purposes. A useful criterion for the color of polyethylene terephthalate is obtained by substracting the yellowness value from the luminance value. The best color for polyethylene terephthalate is obtained when the luminance value minus the yellowness value is at a maximum.

It is an object of this invention to prepare polyethylene terephthalate exhibiting greatly enhanced color characteristics.

It is another object of this invention to prepare polyethylene terephthalate exhibiting a high degree of luminance combined with a low degree of yellowness.

It is a further object of this invention to prepare polyethylene terephthalate for which the luminance value minus the yellowness value is a maximum.

These and other objects are accomplished in the practice of the present invention which is to prepare polyethylene terephthalate by a direct esterification reaction between terephthalic acid and ethylene glycol or by a transesterification reaction between the methyl ester of terephthalic acid and ethylene glycol to form an ester and the polycondensation of said ester in the presence of a novel catalyst system comprising (1) an antimony compound and (2) an arsenic compound.

The use of the novel catalyst system of this invention results in the production of polyethylene terephthalate of greatly improved color. When using the novel catalyst system comprising (1) an antimony compound and (2) an arsenic compound, it has been found unexpectedly, that the yellowness value is less than 10 but not substantially less than zero. Of the many catalytic combinations which can be used according to the process of this invention, viz. a catalytic system comprising (1) an antimony compound and (2) an arsenic compound: all have been found to yield polymers exhibiting high degrees of luminance and a concomitant minimum degree of yellowness. The tests results set forth hereinafter amply support these findings.

Furthermore, the novel catalyst system of this invention satisfies all four of the following criteria:

1. *High Rate of Reaction.*
2. *Polymer Color.* The polyethylene terephthalate produced using the novel catalyst system of this invention more than satisfies the most stringent color requirements of the textile trade.
3. *Polymer Stability.* An exceedingly low degradation rate is obtained when the polymers produced using the novel catalyst system of this invention are heated in the molten state.
4. *Solubility Characteristics.* The novel catalyst system of this invention is substantially soluble in the reaction mixture and in the polymer.

Apart from the enhancement of the color characteristics and rate of polycondensation by the novel catalyst system of this invention, the thermal stability of the resulting polymers is greatly enhanced since compounds comprising the catalyst system remain in the polymer. The presence of the novel catalyst system of this invention greatly enhances subsequent processing operations such as the spinning of fibers and the casting of films which operations are carried out from a polymer melt at elevated temperatures.

The preparation of esters by an ester interchange reaction is generally carried out with a molar ratio of ethylene glycol to dimethyl terephthalate of from about 1:1 to 15:1, respectively, but preferably from about 2:1 to 3:1. The transesterification reaction is generally carried out at atmospheric pressure in an inert atmosphere such as nitrogen, initially at a temperature range of from about 125°C to 290°C, but preferably around 150°C to 260°C, in the presence or absence of a transesterification catalyst. During the first stage, methyl alcohol is evolved and is continually removed by distillation. Employing procedures heretofore known in the art, the ester interchange portion of the reaction or the first step, requires approximately 1 to 4 hours.

Any known suitable transesterification catalyst may be used in the first stage. The transesterification catalyst is used in concentrations from about 0.01 to 0.2% based on the weight of the dimethyl terephthalate used in the initial reaction mixture. Although the novel catalyst combination of this invention is not, itself, an esterification interchange catalyst, it may, in general be added in the esterification interchange catalyst if desired.

The preparation of esters of terephthalic acid and ethylene glycol by direct esterification reaction is generally carried out with a molar ratio of ethylene glycol to terephthalic acid of from about 1:1 to 15:1, preferably about 2:1 to 3:1. The direct esterification reaction is carried out at temperatures ranging from about 170°C to 290°C in the absence of an oxygen containing atmosphere at atmospheric or elevated temperatures for about 2 to 3 hours to form the desired ester product. Air is removed, for example, by purging with nitrogen or other oxygen free inert gas. The polycondensation step, or the polymerization step, of the present invention is effected by adding the novel catalytic mixture comprising an antimony compound and an arsenic compound to an ester, bis-2-hydroxyethyl terephthalate, and heating the mixture thereof under reduced pressure within the range of from about 0.001 millimeters to 100 millimeters of mercury while agitated at a temperature from about 250°C to 330°C for from 1 to 4 hours. In accordance with this invention, the novel catalyst mixture is generally employed in amounts ranging from about 0.01 to 0.2% based on the weight of the ester to be condensed. Higher or lower concentration of the novel catalyst mixture of this invention can also be used in the subject polycondensation reaction.

In general, antimony compounds which may be used in the practice of this invention include salts of antimony and inorganic acids or organic acids, double salts such as potassium antimonyl oxalate and potassium antimony tartrate, and salts of antimony acids such as potassium pyroantimonate. The antimony compounds include antimony salts of aliphatic and aromatic monocarboxylic acids, antimony salts of dicarboxylic acids, e.g. antimony trisglycolate. Typical of the antimony compounds which may be employed as one of the two components of the novel catalyst system of this invention are antimony triacetate, antimony tritallate, antimony tri-2-ethylhexoate, antimony oxalate and antimony tributoxide.

The antimony compound is of the formula $Sb(Y)_n$ wherein Y is selected from the group consisting of R, OOCR', halogen, OR, SR, OOCRSH, SRCOOR',

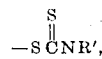

wherein R and R' are independently selected from the group consisting of alkyl, alkenyl, cycloalkyl, aralkyl, aryl, alkaryl, including such radicals when inertly substituted, and $n$ is selected from integers of 3 and 5. The antimony compounds encompassed by this invention include both trivalent and pentavalent antimony compounds.

The antimony compounds include those of the formulae:

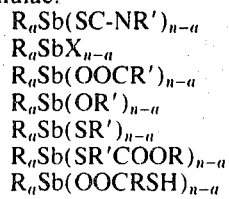

wherein $n$ is the valence of antimony, 3 or 5, and $a$ is an integer less than 5, R and R' are as defined above and X is halogen or oxygen.

In this compound, R and R' are hydrocarbon radicals preferably selected from the group consisting of alkyl, alkenyl, cycloalkyl, aralkyl, aryl, alkaryl, including such radicals when inertly substituted. Alkyls are typically straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, i.e. octyls and lower. Typical alkenyls include vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. Typical cycloalkyls include cyclopentyl, cyclohexyl, cycloheptyl, cyclooctyl, etc. When R is aralkyl, it may typically be benzyl, β-phenylethyl, η-phenylpropyl, β-phenylpropyl, etc. Typical aryls include phenyl, naphthyl, etc. Typical alkaryls include tolyl, xylyl, p-ethylphenyl, p-nonylphenyl, etc. R and R' may be inertly substituted, e.g. may bear non-reactive substituents such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, η-phenylpropyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

Among the antimony compounds used in the practice of this invention are antimony carboxylates.

The anionic component of the antimony carboxylate is expressed in simplest form as $R'''(COO^-)_n$ wherein $R'''$ represents a hydrocarbon group, typically an aliphatic or cycloaliphatic group such as alkyl, alkenyl, etc., and corresponding cyclic groups such as cycloalkyl, etc. groups; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as a naphthenic group; etc. Other equivalent groups may be employed. Preferably $n$ is 1 and the acid is monobasic. $n$ may be a small whole integer, typically 1, 2, 3, etc. In the preferred embodiment, $R'''$ may be an alkyl group having less than about 20 carbon atoms. Typical of the acids from which the antimony salts may be prepared may be acetic acid, propionic acid, butyric acid, caproic acid, caprylic acid, capric acid, stearic acid, oleic acid, etc. Napthenic acid may be employed. The commercially occurring mixture of acids known as tall oil fatty acids are preferred in the practice of this invention.

It is preferred that the antimony carboxylate be formed from an amount of acid sufficient to satisfy each of the valence bonds of the antimony metal. The salts which may be used in practice of this invention may be those materials prepared for example by neutralizing a basic compound of the metal, typically the hydroxide or oxide.

Specific antimony compounds operable in the practice of this invention include:

antimony tritallate
antimony-2-ethylhexoate
antimony tristearate
antimony trilaurate
antimony trimyristate
antimony tripalmitate
antimony trioleate
antimony triricinoleate
antimony trinaphthenate
antimony tribenzoate
antimony trisalicylate
antimony triphenoxide
antimony tricresoxide
antimony trixylenoxide
antimony nonylphenoxide
antimony caproate diheptylate
antimony tricaprylate dibromide
antimony tributyrate dibromide
antimony tricinnamate dibromide
antimony trivalerate dibromide
antimony triheptylate dibromide
antimony tricaprate dibromide
tris(2,3-dichloropropyl) antimonite
tris(β-chloroethyl) antimonite
tris(β-chlorobutyl) antimonite tris(2-chloro-2-phenylethyl) antimonite
tris(n-octoxy) antimony dibromide
tris(2-ethylhexoxy) antimony dibromide
tribenzoxy antimony dibromide
tris(β-chloroethoxy) antimony dibromide
tris(β-chlorobutoxy) antimony dibromide
phenyl antimony dibromide
tolylantimony dibromide
butylantimony diiodide
benzylantimony dichloride
cyclohexylantimony dibromide
allylantimony diiodide
chlorophenylantimony dichloride
octylantimony dibromide
diphenylantimony acetate
diphenylantimony propionate
diphenylantimony butyrate
ditolylantimony α-methylpropionate
dixylylantimony α-methylpropionate
di-α-naphthylantimony acetate
ditolylantimony butyrate
bis(p-chlorophenyl) antimony η-chlorobutyrate
diphenylantimony β-ethoxypropionate
diethylantimony acetate
di-n-propylantimony propionate
di-n-butylantimony α-methylpropionate
di-n-octylantimony propionate
dilaurylantimony butyrate
bis(2-ethylhexyl) antimony α-methylpropionate
di-n-hexylantimony acetate
diallylantimony acetate
di-2-butenylantimony propionate
dibenzylantimony α-methylpropionate
dicyclohexylantimony acetate
diphenylantimony valerate
diphenylantimony caproate
ditolylantimony α-methylvalerate
dixylylantimony β-methylvalerate
diethylantimony α-ethylcaproate
di-n-propylantimony caprylate
di-n-butylantimony caprate
di-α-naphthylantimony pelargonate
di-n-octylantimony laurate
dilaurylantimony stearate
di-2-ethylhexylantimony oleate
di-n-hexylantimony benzoate
diallylantimony p-toluate
di-2-butenylantimony p-ethylbenzoate
dibenzylantimony α-naphthoate
dicyclohexylantimony phenylacetate
diphenylantimony phenoxyacetate
diphenylantimony linoleate
ditolylantimony cyclohexanoate
diphenylantimony tetrachlorobenzoate
diphenylantimony tallate
ditolylantimony rosinate
bis(p-chlorophenyl) antimony pelargonate
diphenylantimony p-chlorobenzoate
diphenylantimony dithiocarbamate
dibutylantimony methyldithiocarbamate
diphenylantimony dimethyldithiocarbamate
ditolylantimony ethyldithiocarbamate
diallylantimony diethyldithiocarbamate
phenylantimony di(n-propyldithiocarbamate)
tolylantimony di(di-n-propyldithiocarbamate)
butylantimony di(isopropyldithiocarbamate)
allylantimony di(diisopropyldithiocarbamate)
benzylantimony di(butyldithiocarbamate)
cyclohexylantimony di(dibutyldithiocarbamate)
chlorophenylantimony di(octyldithiocarbamate)
octylantimony di(dioctyldithiocarbamate)
dibenzylantimony dodecyldithiocarbamate
dichlorophenylantimony didodecyldithiocarbamate
dicyclohexylantimony hexadecyldithiocarbamate
dioctylantimony phenyldithiocarbamate
diphenylantimony diphenyldithiocarbamate
dicyclohexylantimony cyclohexyldithiocarbamate
phenylantimony di(dicyclohexyldithiocarbamate)
tolylantimony di(allyldithiocarbamate)
cyclohexylantimony di(diallyldithiocarbamate)
diphenylantimony benzyldithiocarbamate
dibenzylantimony dibenzyldithiocarbamate
di(diphenylantimony) methylenebisdithiocarbamate di(ditolylantimony) ethylenebisdithiocarbamate
di(dicyclohexylantimony) propylenebisdithiocarbamate
phenylantimony trimethylenebisdithiocarbamate
tolylantimony tetramethylenebisdithiocarbamate
butylantimony hexamethylenebisdithiocarbamate
allylantimony octamethylenebisdithiocarbamate
benzylantimony o-phenylenebisdithiocarbamate
phenylantimony m-phenylenebisdithiocarbamate
di(diphenylantimony) p-phenylenebisdithiocarbamate
di(ditolylantimony) α-tolylenebisdithiocarbamate
chlorophenylantimony xylylenebisdithiocarbamate
di(diphenylantimony) 4,4'-biphenylenebisdithiocarbamate
di(diphenylantimony) 4-chloro-1,2-phenylenebisdithiocarbamate
diphenylantimony dimethylenedithiocarbamate
phenylantimony di(pentamethylenedithiocarbamate)
cyclohexylantimony di(hexamethylenedithiocarbamate)
tolylantimony N,N'-diethyl ethylenebisdithiocarbamate
butylantimony di(N-methyl ethyldithiocarbamate)

allylantimony N,N'-dimethyl hexamethylenebisdithiocarbamate
dichlorophenylantimony N-(3-chloro-2-butenyl)-cyclohexyldithiocarbamate
octylantimony di(N-cyclohexyl amyldithiocarbamate)
antimony S,S',S'' tri(octadecyl thiomaleate)
antimony S,S',S'' tri(dihydroabietyl mercaptoacetate)
antimony S,S',S'' tri(nonylmercaptoacetate)
triphenylantimony S,S' bis(isoctylmercaptoacetate)
tri-n-octylantimony S,S' bis(isooctylmercaptoacetate)

Other antimony compounds operable as components of the novel catalyst system of this invention include:

trimethylstibine
triethylstibine
tributylstibine
trioctylstibine
trivinylstibine
triphenylstibine
pentaphenylstibine
methyldichlorostibine
butyldichlorostibine
octyldichlorostibine
lauryldichlorostibine
vinyldichlorostibine
phenyldichlorostibine
methyldichlorostibine dichloride
octyldichlorostibine dichloride
phenyldichlorostibine dichloride
dimethylchlorostibine
dibutylchlorostibine
dioctylchlorostibine
diphenylchlorostibine
dimethylchlorostibine dichloride
dibutylchlorostibine dichloride
trimethylstibine dichloride
tributylstibine dichloride
trioctylstibine dichloride
triphenylstibine dichloride
triphenylstibine iodide cyanide
tetraethylstibonium iodide
stibosobutane
stibosooctane
stibosobenzene
thiostibosobenzene
triethylstibine oxide
tributylstibine oxide
trioctylstibine oxide
triphenylstibine oxide
tributylstibine sulfide
methylstibonic acid
octylstibonic acid
phenylstibonic acid
dimethylstibinic acid
dibutylstibinic acid
dioctylstibinic acid
dioctadecylstibinic acid
diphenylstibinic acid
butyldioctoxystibine
phenyldibutoxystibine
butyldithiolaurylstibine
butyldiacetoxystibine
octyldiacetoxystibine
phenyldiacetoxystibine
butylantimony dilaurate
octylantimony dibenzenesulfonamide
dibutylbutoxystibine
dibutylacetoxystibine
diphenylacetoxystibine
dibutylthiolaurylstibine
dibutylantimony benzenesulfonamide
bis(dimethylantimony) oxide
bis(dibutylantimony) oxide
bis(dioctylantimony) oxide
bis(diphenylantimony) oxide
bis(dibutylantimony) sulfide
bis(diphenylantimony) sulfide
tetramethyldistibine
tetraethyldistibine
tetraoctyldistibine
tetraphenyldistibine Extensive testing of a large variety of arsenic sacrificial catalysts has indicated that, while they vary somewhat in their activity, all arsenic compounds possess outstanding catalytic activity of a sacrificial nature, as demonstrated in test results later described. The arsenic compound may have one or more bonds from arsenic to one or more organic radicals to halogen, hydrogen, oxygen, sulfur or nitrogen atoms. Among the many types of such compounds containing arsenic of which specific representative compounds have been tested and shown to be active are: arsenic tristearate, arsenic tritallate, arsenic triacetate, tributylarsine, trioctylarsine, tribenzylarsine, trivinylarsine, and triphenylarsine. Other compounds having at least one carbon to arsenic bond which the remaining valences of the tri- and penta- valent atoms are taken up by bonds to hydrogen, halogen or hydroxyl atoms include octylarsine, octyldichloroarsine, phenyldimercaptoarsine, dichloroarsine, phenyldimercaptoarsine, phenylarsenic sesquisulfide, octyldichloroarsine dichloride, phenyldichloroarsine dichloride, dibutylarsine, dioctylchloroarsine, diphenylchloroarsine, dibutylchloroarsine dichloride, and tetrabutylarsonium hydroxide. Other arsenic compounds having at least one double bond from arsenic to oxygen or sulfur are also efficacious. These include arsenosooctane, arsenosobenzene, thioarsenosododecane, isoamylarsenic disulfide, tributylarsine oxide, triphenylarsine oxide, and tributylarsenic sulfide. Other arsenic compounds having at least one double bond from arsenic to oxygen or sulfur and in addition at least one bond from arsenic to a halogen atom or a hydroxyl group are also useful. These include phenyldichloroarsine oxide, octylarsonic acid, phenylarsonic acid, and diphenylarsinic acid. Other arsenic compounds having at least one direct bond from carbon to arsenic and the remaining valences occupied by bonds to oxygen, sulfur or nitrogen linking organic radicals to the arsenic atom are also useful. These include butyldioctoxyarsine, lauryldiphenoxyarsine, phenylarsenic dilaurate, octylarsenic dibenzenesulfonamide, methyldithiolaurylarsine, dibutylbutoxyarsine, dibutylphenoxyarsine, dibutylacetoxyarsine, dibutylarsenic laurate, dibutylarsenic toluenesulfonamide, and dibutylthiolaurylarsine. Other arsenic compounds having two or more arsenic atoms that may or may not be bonded to one another but at least have one carbon atom bonded to each arsenic atom and possibly also bonds from the arsenic atom to hydrogen, halogen, oxygen, sulfur or nitrogen are also operable. Such compounds include arsenopropane, arsenobenzene, bis(dibutylarsenic) oxide, bis(dioctylarsenic) oxide, bis(diphenylarsenic) oxide, and bis(dibutylarsenic) sulfide.

It is to be understood that the organic radicals linked to the arsenic atoms directly or through oxygen, sulfur or nitrogen need not be the same in any given compound and that the structure of the compound need not in any sense be symmetrical.

The novel catalyst system of this invention can be added in any suitable amount, preferably in an amount between 0.005 and 1% by weight based on the weight of bis($\beta$-hydroxyethyl) terephthalate used. The ratio of arsenic compound to antimony compound in the catalyst system should be between 0.01 and 1, preferably about 0.1 or lower. An ester interchange catalyst may be used in the first stage. Many such catalysts are known. They include alkaline earth salts and such compounds as titanium dioxide, calcium acetate, and zinc acetate. The novel polycondensation catalyst system of this invention may in certain instances, be added to an ester interchange reaction mixture if desired, but it has been found that it is preferable, in some instances, to add the polycondensation catalyst after deactivation of the ester interchange catalyst. This later addition results in the obtaining of polymers having high degrees of luminance and low degrees of yellowness.

The following examples illustrate this invention particularly with respect to the preparation of highly polymeric polyethylene terephthalate by starting with bis($\beta$-hydroxyethyl) terephthalate. The catalyst of this invention is also operable in catalyzing the polymerization of other esters of terephthalic acid such as the ethyl, propyl, butyl, and phenyl esters. The polymerization of esters of other organic acid compounds are also catalyzed by the novel catalyst system of this invention. These include esters of adipic acid, butyric acid, sebacic acid, maleic acid, tetrachlorophthalic acid, phthalic acid, cyclohexane carboxylic acid, cyclohexane dicarboxylic acid, benzoic acid, paramethyl benzoic acid, etc. Anhydrides and half esters of these acids may be employed. In practice of the invention, the term "acid compound" may herein be used to include these anhydrides and half esters as well as the acids. Typical of the anhydrides may be phthalic anhydride, maleic anhydride, etc.; typical of the half esters may be, e.g. isooctyl acid phthalate, isooctyl acid maleate, etc.

EXAMPLE 1

This examples illustrates a complete two-step process for the preparation of polyethylene terephthalate from dimethyl terephthalate and ethylene glycol.

2,000° parts by weight of dimethyl terephthalate, 1,400 parts by weight of ethylene glycol, and 0.3 parts by weight of zinc acetate were heated in a three-necked flask, equipped with a stirrer and condenser, at atmospheric pressure until that quantity of methanol theoretically calculated to evolve had been distilled off (viz. 836 milliliters of methanol). The zinc acetate esterification catalyst was sequestered by adding 1.38 parts of tri-nonylphenyl phosphite, stirring and heating the reaction mixture for 15 minutes. The bis($\beta$-hydroxyethyl) terephthalate product was then isolated.

1,000 grams of the bis ($\beta$-hydroxyethyl) terephthalate monomer and 0.5 grams of antimony triacetate, 0.03 grams of arsenic triacetate and 3.8 grams of titanium dioxide were added to a polyester reactor preheated to 260°C. The temperature of the reactor was then adjusted to 280°C simultaneously with the application of a vacuum of 0.5 millimeters of mercury. The polymerization was allowed to proceed for 150 minutes. The ethylene glycol formed as a result of the polymerization was distilled off and collected. Upon cooling, the polyethylene terephthalate product exhibited an intrinsic viscosity of 0.75 and a melting point of 262°C.

The reflectance of a plaque of the polymer product was measured on a "Colormaster". The luminance was 68 and the yellowness was 10, the L-Y value being 58.

EXAMPLE 2

The process of Example 1 was followed except that the charge to the polymerization reactor consisted of 1000 grams of bis($\beta$-hydroxyethyl) terephthalate and 0.0125 grams of antimony triacetate, and 0.025 grams of arsenic pentoxide. The polymerization reaction was allowed to proceed for 3.75 hours. Upon cooling, the polyethylene terephthalate product exhibited an intrinsic viscosity of 0.80 and a melting point of 265°C.

The reflectance of a plaque of the polymer product was measured on a "Mecco Colormaster". The luminance was 62 and the yellow index was 7; the L-Y value being 55.

The novel catalyst system of this invention, viz. a system comprising a mixture of (1) an antimony compound and (2) an arsenic compound, results in a polymer exhibiting an outstanding color as shown in comparative examples hereinafter:

A polyethylene terephthalate polymer made under the same conditions and using the same equipment as that of Example 2 except that 0.5 grams of antimony triacetate alone was used as the polycondensation catalyst exhibited a luminance of 65 and a yellowness of 21, i.e. a L-Y value of 44.

The yellowness of a polymer made using the catalyst system of this invention was 14 units better than that using an antimony catalyst alone.

EXAMPLE 3

The process of Example 1 was followed except that the charge added to the polymerization reactor consisted of 1000 grams of bis($\beta$-hydroxyethyl) terephthalate, 0.5 grams of antimony triacetate (0.05% of the weight of the monomer), 0.05 grams of triphenylarsenic oxide, and 3.8 grams of titanium dioxide. The polymerization reaction was allowed to proceed for 3.5 hours. Upon cooling the polyethylene terephthalate product exhibited an intrinsic viscosity of 0.76 and a melting point of 261°C.

For the purpose of comparing the yellowness and luminance of samples of polyethylene terephthalate product, the reflectance of the polymer was measured on a "Colormaster" which is the trade name for the differential colorimeter manufactured by the Mecco Corporation. The luminance was 65 and the yellowness was 8, the L-Y value being 57.

EXAMPLE 4

The process of Example 1 was followed except that the charge to the polymerization reactor consisted of 1000 grams of bis($\beta$-hydroxyethyl) terephthalate, 3.43 grams (0.343% of the weight of the monomer) of antimony tristallate, 0.10 grams of arsenic tritallate, and 3.8 grams of titanium dioxide. The polymerization reaction was allowed to proceed for 3.5 hours. Upon cooling, the polyethylene terephthalate product exhibited an intrinsic viscosity of 0.77 and a melting point of 264°C.

For the purpose of comparing the yellowness and luminance of samples of polyethylene terephthalate product, the reflectance of the polymer was measured on a Colormaster which is the trade name for the differential colorimeter manufactured by the Mecco Corporation. The luminance was 48 and the yellowness was 0, the L-Y value being 48.

EXAMPLE 5

The process of Example 1 was followed except that the charge added to the polymerization reactor consisted of 1000 grams of bis($\beta$-hydroxyethyl) terephthalate, 0.5 grams (0.05% of the weight of the monomer) of antimony triacetate, 0.05 grams of phenylarsenic acid, and 3.8 grams (0.38% of the weight of the monomer) of titanium dioxide. The polymerization reaction was allowed to proceed for 2 hours. Upon cooling the polyethylene terephthalate product exhibited an intrinsic viscosity of 0.79 and a melting point of 262°C.

For the purpose of comparing the yellowness and luminance of samples of polyethylene terepthalate product, the reflectance of the polymer was measured on a Colormaster which is the trade name for the differential colorimeter manufactured by the Mecco Corporation. The luminance was 64 and the yellowness 12, the L-Y value being 52.

EXAMPLE 6

The process of Example 1 was followed except that the charge added to the polymerization reactor consisted of 1000.0 grams of bis($\beta$-hydroxyethyl) terephthalate, 1.0 grams (0.10% of the weight of the monomer) of antimony triacetate, 0.10 grams (0.01% of the weight of the monomer) of triphenylarsine, and 3.8 grams (0.38% of the weight of the monomer) of titanium dioxide. The polymerization reaction was allowed to proceed for 3.5 hours. Upon cooling, the polyethylene terephthalate product exhibited an intrinsic viscosity of 0.84.

For the purpose of comparing the yellowness and luminance of samples of polyethylene terephthalate product, the reflectance of the polymer was measured on a Colormaster which is the trade name for the differential colorimeter manufactured by the Mecco Corporation. The luminance value was 52 and the yellowness 3, resulting in an L-Y value of 49.

EXAMPLE 7

The process of Example 1 was followed except that the charge added to the polymerization reactor consisted of 1000.0 grams of bis($\beta$-hydroxyethyl) terephthalate and 0.5 grams (0.05% of the weight of monomer) of antimony triacetate, 0.0032 grams of arsenic pentoxide (0.00032% of the weight of the monomer), and 3.8 grams of titanium dioxide. The polymerization reaction was allowed to proceed for 4 hours. Upon cooling, the polyethylene terephthalate product exhibited an intrinsic viscosity of 0.74.

For the purposes of comparing the yellowness and luminance of samples of polyethylene terephthalate product, the reflectance of the polymer was measured on a Colormaster which is the trade name for the differential colorimeter manufactured by the Mecco Corporation. The luminance value was 66 and the yellowness 9, resulting in an L-Y value of 57.

EXAMPLE 8

The process of Example 1 was followed except that the charge to the polymerization reactor consisted of 1000 grams of bis($\beta$-hydroxyethyl) terephthalate and 3.43 grams (0.343% of the weight of the monomer) of antimony tristallate, 0.10 grams (0.01% of the weight of the monomer) of arsenic tristallate, and 3.8 grams (0.38% of the weight of the monomer) of titanium dioxide. The polymerization reaction was allowed to proceed for 3.5 hours. Upon cooling the polyethylene terephthalate product exhibited an intrinsic viscosity of 0.77 and a melting point of 261°C.

For the purpose of comparing the yellowness and luminance of samples of polyethylene terephthalate product, the reflectance of the polymer was measured on a Colormaster which is the trade name for the differential colorimeter manufactured by the Mecco Corporation. The luminance value was 48 and the yellowness 0, resulting in an L-Y value of 48.

EXAMPLE 9

The process of Example 1 was followed except that the charge added to the polymerization reactor consisted of 1000 grams of bis($\beta$-hydroxyethyl) terephthalate and 3.43 grams (0.343% of the weight of the monomer) of antimony tristallate, 0.10 grams (0.01% of the weight of the monomer) of arsenic tristearate and 3.8 grams (0.38% of the weight of the monomer) of titanium dioxide. The polymerization reaction was allowed to proceed for 3.5 hours. Upon cooling the polyethylene terephthalate product exhibited an intrinsic viscosity of 0.79 and a melting point of 260°C.

For the purpose of comparing the yellowness and luminance of samples of polyethylene terephthalate product, the reflectance of the polymer was measured on a Colormaster which is the trade name for the differential colorimeter manufactured by the Mecco Corporation. The luminance value was 56, the yellowness 5, and the L-Y value 51.

EXAMPLE 10

The process of Example 1 was followed except that the charge to the polymerization reactor consisted of 1000 grams of bis($\beta$-hydroxyethyl) terephthalate and 1.0 grams of antimony triacetate (0.10% of the weight of the monomer), 0.10 grams of triphenylarsine (0.01% of the weight of the monomer), and 3.8 grams of titanium dioxide (0.38% of the weight of the monomer). The polymerization reaction was allowed to proceed for 3.5 hours. Upon cooling, the polyethylene terephthalate product exhibited an intrinsic viscosity of 0.84 and a melting point of 265°C.

For the purpose of comparing the yellowness and luminance of samples of polyethylene terephthalate product, the reflectance of the polymer was measured on a Colormaster which is the trade name for the differential colorimeter manufactured by the Mecco Corporation. The luminance value was found to be 52, the yellow 3, and resulting in an L-Y value of 49.

EXAMPLE 11

The process of Example 1 was followed except that the charge added to the polymerization reactor consisted of 1000 grams of bis($\beta$-hydroxyethyl) terephthalate, and 0.5 grams (0.05% of the weight of the monomer) of antimony triacetate, 0.0063 grams (0.00063% of the weight of the monomer) of arsenic trioxide, and 3.8 grams (0.38% of the weight of the monomer) of titanium dioxide. The polymerization reaction was allowed to proceed for 3.5 hours. Upon cooling the polyethylene terephthalate product exhibited an intrinsic viscosity of 0.81 and a melting point of 261°C.

For the purpose of comparing the yellowness and luminance of samples of polyethylene terephthalate product, the reflectance of the polymer was measured on a Colormaster which is the trade name for the differential colorimeter manufactured by the Mecco Corporation. The luminance value was 65, the yellowness 10, and the L-Y value 55.

To illustrate the dramatic enhancement of the color properties effected by the use of the catalyst system of this invention comparison polymerizations were conducted using the same equipment and the same conditions as used in Examples 1 through 11. These comparison or control polymerizations differed only in that 0.5 grams of germanium dioxide (0.05% of the weight of the monomer) was used in one polymerization. After 3.5 hours of reaction the resulting polymer exhibited a luminance value of 71, a yellowness index of 22, and a L-Y value of 49.

To show that antimony compounds alone used as a catalyst will not effect the dramatic color enhancement, a further polymerization was conducted using antimony triacetate as a polymerization catalyst. The polymerization was conducted under conditions and amounts identical with those of the foregoing examples.

Without the presence of an arsenic compound, polyethylene terephthalate polymerized in the presence of antimony triacetate exhibited a luminance of 65 and a yellow index of 21, and a L-Y value of 44.

Table 1 sets forth the luminance values, the yellowness values, and the L-Y values for each of the foregoing Examples and for the comparison polymers polycondensed in the presence of catalysts other than the novel catalyst system of this invention.

TABLE I

| Polymers of | COLOR CHARACTERISTIC | | |
|---|---|---|---|
| | Luminance Value | Yellowness Value | L-Y |
| Example 1 | 68 | 10 | 58 |
| Example 2 | 62 | 7 | 55 |
| Example 3 | 65 | 8 | 57 |
| Example 4 | 48 | 0 | 48 |
| Example 5 | 64 | 12 | 52 |
| Example 6 | 52 | 3 | 49 |
| Example 7 | 66 | 9 | 57 |
| Example 8 | 48 | 0 | 48 |
| Example 9 | 56 | 5 | 51 |
| Example 10 | 52 | 3 | 49 |
| Example 11 | 65 | 10 | 55 |
| Control Using Antimony Triacetate Alone | 65 | 21 | 44 |
| Control Using Germanium Dioxide | 71 | 22 | 49 |

The foregoing data show the dramatic and unexpected decrease in yellowness obtained by the use of the novel catalyst system of this invention.

The products of this invention exhibit enhanced flame resistance. As an added feature of this invention the novel catalysts of this invention act as internal lubricants such that the spinning of the products into fibers is greatly facilitated.

Although this invention has been illustrated by reference to specific examples, numerous changes and modifications thereof which clearly fall within the scope of the invention will be apparent to those skilled in the art.

We claim:

1. A novel catalyst composition for use as a polymerization catalyst in the production of polyethylene terephthalate, said catalyst composition consisting essentially of
   a. an antimony compound having one of the following formulae:

$Sb(Y)_n$ or $Y_3Sb = O$; and b. an arsenic compound having one of the following formulae:

$As(Y)_n$ or $Y_3As = O$, wherein each Y is individually selected from the group of monovalent radicals consisting of R, —OOCR, halogen, —OR, —SR, —OOCRSH, —SRCOOR' and $$-\overset{S}{\underset{\parallel}{SCNR_2}},$$

wherein R and R' are independently selected from the group consisting of alkyl, alkenyl, cycloalkyl, aralkyl, aryl, and alkaryl radicals and $n$ represents the integer 3 or 5, wherein said antimony compound is other than an antimony trihalide and with the proviso that the ratio of arsenic compound to antimony compound is between 0.01:1 and 1:1, respectively.

2. The composition of claim 1 wherein said antimony compound is of the formula $R_aSb(OOCR')_{n-a}$ wherein $n$ is 3 or 5, and $a$ is an integer less than 5 or zero.

3. The composition of claim 1 wherein said antimony compound is antimony triacetate.

4. The composition of claim 1 wherein said antimony compound is antimony tristallate.

5. The composition of claim 1 wherein said antimony compound is of the formula $R_aSbX_{n-a}$, or $R_3Sb=O$ wherein X is a halogen atom, $n$ is 3 or 5 and $a$ is an integer between 1 and 5, inclusive.

6. The composition of claim 1 wherein said antimony compound is an antimony alcoholate of the formula $$Sb\begin{array}{c}OR_1\\-OR_2\\OR_3\end{array}$$

wherein $R_1$, $R_2$, and $R_3$ are hydrocarbon radicals selected from the same group as R.

7. The composition of claim 6 wherein said antimony alcoholate is antimony trisbutoxide.

8. The composition of claim 1 wherein said arsenic compound is of the formula $R_aAs(OOCR')_{n-a}$ wherein $n$ is 3 or 5, and $a$ is an integer less than 5 or zero.

9. The composition of claim 8 wherein said arsenic compound is arsenic triacetate.

10. The composition of claim 8 wherein said arsenic compound is arsenic tristearate.

11. The composition of claim 8 wherein said arsenic compound is arsenic tristallate.

12. The composition of claim 8 wherein said arsenic compound is triphenyl arsine.

13. The composition of claim 1 wherein said arsenic compound is of the formula $R_aAsX_{n-a}$, or $R_3As=O$ wherein X is a halogen atom, $n$ is 3 or 5, and $a$ is an integer between 1 and 5, inclusive.

14. The composition of claim 13 wherein said arsenic compound contains at least one carbon to arsenic bond.

15. The composition of claim 14 wherein said arsenic compound is triphenyl arsenic oxide.

16. The composition of claim 13 wherein said arsenic compound contains at least one double bond from arsenic to oxygen.

17. The composition of claim 16 wherein said arsenic compound is tributylarsine oxide.

18. The composition of claim 1 wherein said arsenic compound exhibits at least one direct bond from arsenic to carbon, a double bond from arsenic to oxygen and at least one bond from arsenic to a halogen atom.

19. The composition of claim 1 wherein said arsenic compound exhibits at least one direct bond from arsenic to carbon and the remaining valences occupied by bonds to oxygen linking organic radicals to arsenic.

20. The composition of claim 19 wherein said arsenic compound is butyldioctoxyarsine.

* * * * *